Jan. 10, 1950 J. M. GOLDSTEIN 2,494,236
PIE MAKING MACHINE

Filed Sept. 4, 1945 7 Sheets-Sheet 1

INVENTOR.
J. M. Goldstein
BY
ATTORNEYS.

Jan. 10, 1950     J. M. GOLDSTEIN     2,494,236
PIE MAKING MACHINE

Filed Sept. 4, 1945     7 Sheets-Sheet 2

J. M. Goldstein
INVENTOR.

BY
ATTORNEYS.

Jan. 10, 1950  J. M. GOLDSTEIN  2,494,236
PIE MAKING MACHINE

Filed Sept. 4, 1945  7 Sheets—Sheet 3

J. M. Goldstein
INVENTOR.

BY
ATTORNEYS.

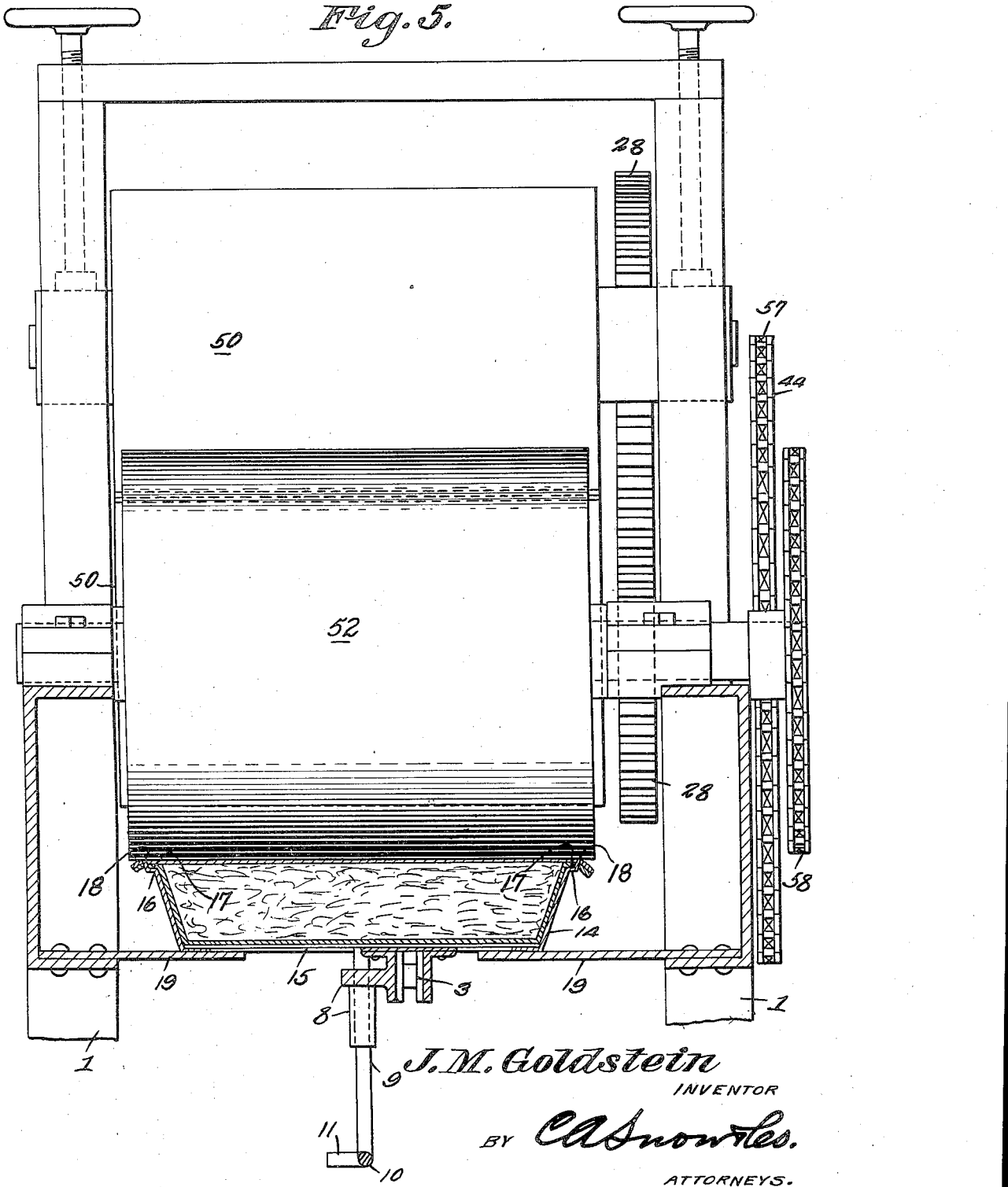

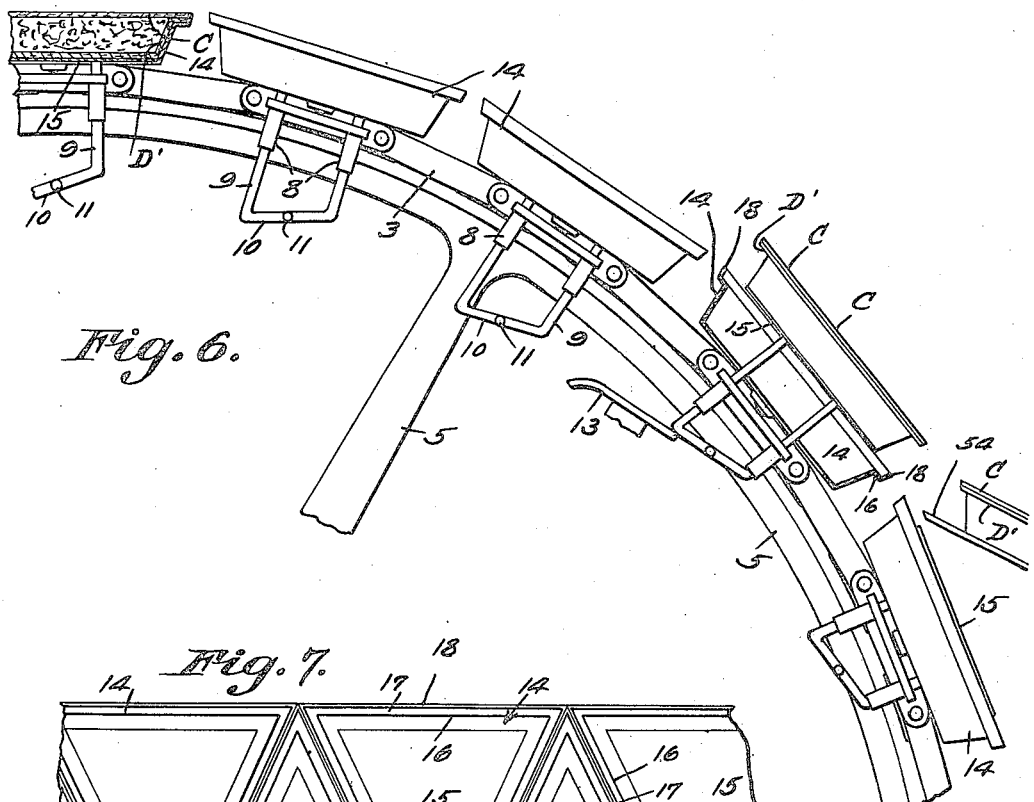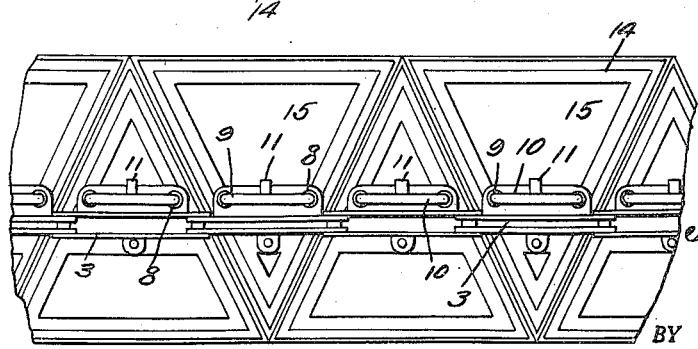

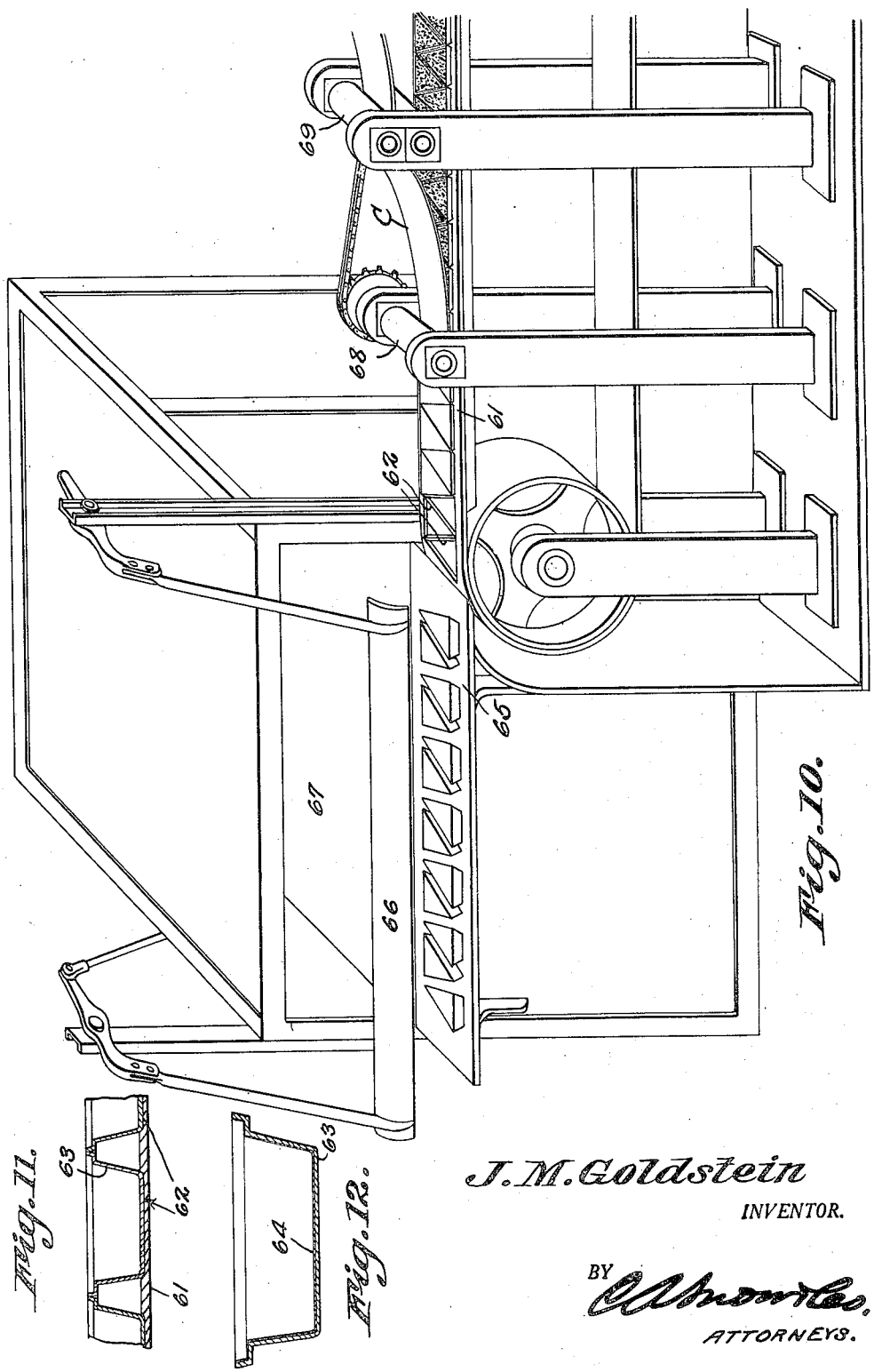

Patented Jan. 10, 1950

2,494,236

UNITED STATES PATENT OFFICE 2,494,236

PIE-MAKING MACHINE

Jacob M. Goldstein, Wilkes-Barre, Pa.

Application September 4, 1945, Serial No. 614,192

2 Claims. (Cl. 107—1)

1

This invention relates to machines for making pies, an object being to provide a machine, which, in successive operations, forms dough into a continuous strip or web, molds the dough in a series of pans travelling toward an oven, fills the pies, applies and trims off a web or strip of dough to form the top coverings of the pies, and thereafter effects baking of the pies, the entire operation being effected automatically and the pies thus formed, being of segmental or any other desired shape.

The primary purpose of the invention is to produce quickly and in large quantities, pies which are of segmental shape so each completed pie can be sold at the cost of the usual section of a pie dispatched to a customer.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings, the preferred forms of the invention have been shown.

In said drawings,

Figure 5 is an enlarged section on line 5—5, Figure 1.

Figure 6 is a side elevation of a portion of the pie conveying and ejecting means.

Figure 7 is a top plan view showing a series of pie plates as assembled on the conveyor.

Figure 8 is a bottom plan view of the conveyor and of the pie plates thereon.

Figure 10 is a view showing a portion of a modified form of the machine in perspective.

Figure 11 is a section through a conveyor belt, such as illustrated in Figure 10 and in which pans are positioned.

Figure 12 is a section through one of the pans and showing the same lined with a removable foil container.

Figure 1:
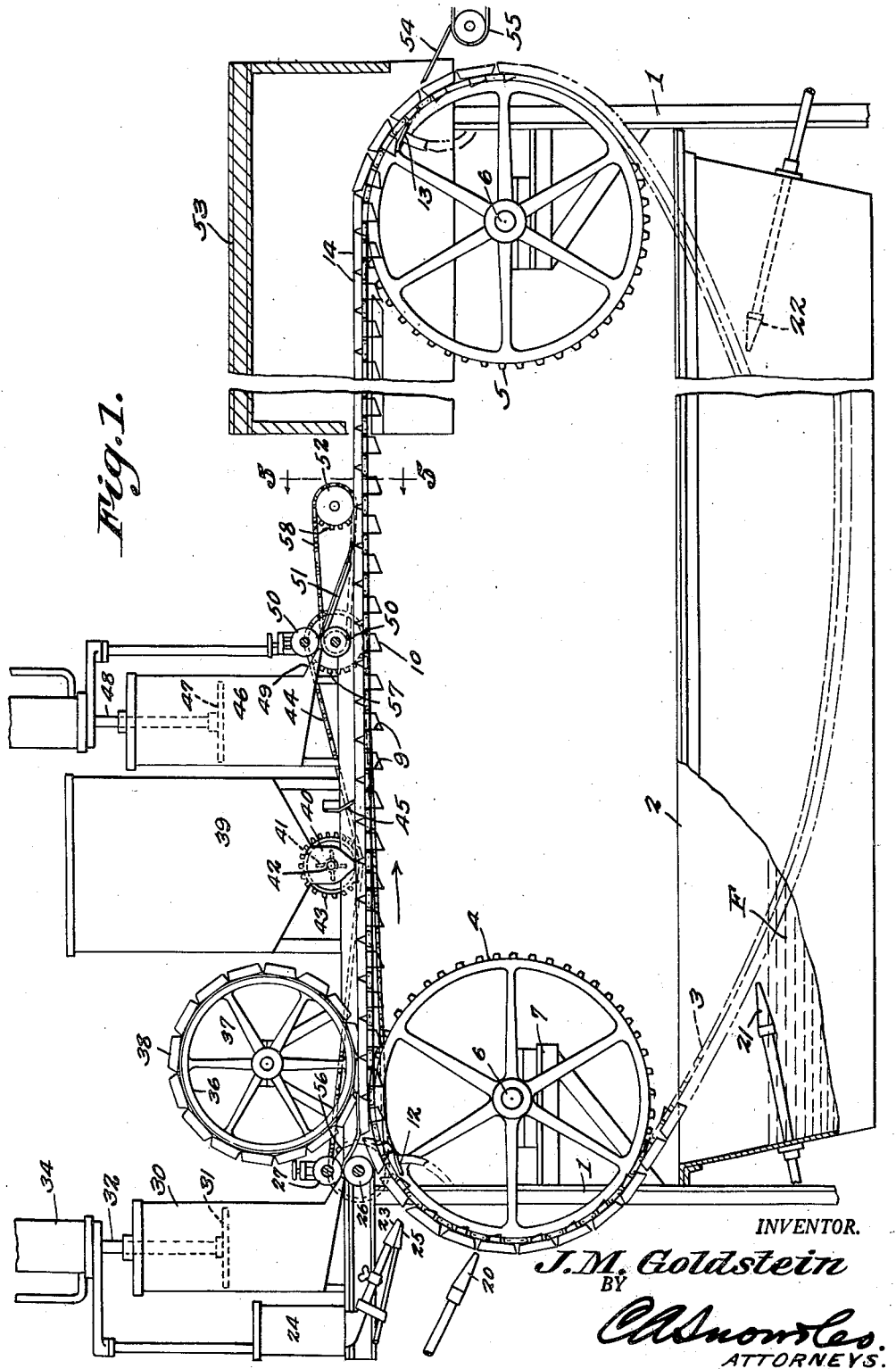
Figure 1 is a front elevation, partly in section and with a portion being broken away, showing the complete machine.

Referring to the figures by characters of reference, 1 designates a main supporting structure in the lower portion of which is located a tank 2 for holding a cleansing fluid F and movably suspended within this tank is the lower flight of an endless conveyor belt 3 mounted on widely spaced sprockets 4 and 5, the shafts 6 of which are journaled in suitable bearings 7 and adapted to be driven continuously in one direction by any suitable mechanism provided for that purpose.

At regularly spaced intervals the links of the chain belt 3 are provided with guides 8 extending laterally therefrom in which are slidably mounted yokes 9. The arms of each yoke are parallel as shown, for example in Figure 6 and are movable along lines perpendicular to the links to which they are attached. The inner ends of the arms of each yoke are joined by inclined connecting portions 10 to which is extended a lug 11 projecting laterally therefrom. Located substantially within the area defined by each of the gears or sprockets 4 and 5 is a tripping cam 12 and 13 respectively. Cam 12, which is located in the area defined by sprocket 4, is so positioned that as the chain moves in one direction, the lug 11 will be brought successively into contact with the inner side of the cam 12 so as to be pulled inwardly toward the axis of rotation of sprocket 4. The other cam 13, however, which is located in the area defined by the sprocket 5, is so positioned that, when it is engaged by a lug 11, it will force the lug outwardly along a line substantially radial to the shaft of sprocket 5. It is to be understood, of course, that the two cams 12 and 13 are fixedly supported.

An endless series of pans 14 is secured on the links of the belt or conveyor 3. Each of these pans has its bottom formed of a plate 15 secured to the arms of the adjoining yokes 9. Thus when the arms 9 are in their normal positions, the plates 15 constitute closures for the bottoms of the respective pans but when the yokes 9 are pressed outwardly as before explained, they cause these bottom plates 15 to move outwardly, thereby expelling any material which may have been deposited in the pans 14.

It is to be understood that the pans can be of any desired shapes and sizes. It is preferred, however, to make the pans substantially segmental or triangular with the walls tapered toward the bottom of the pan. Furthermore the walls of the pan are preferably offset along their upper edges as shown at 16 to provide shoulders or ledges 17 surrounded by upstanding flanges 18.

For the purpose of supporting the upper flight of the endless conveyor chain 3 it is preferred to position it between parallel supporting rails or strips 19 on which the pans 14 are adapted to slide. See Figure 5.

The upper flight of the conveying belt or chain is adapted to move the supported pans successively past various mechanisms designed to clean, and grease the pans, apply dough to the interior surfaces thereof, fill the pans with the pie filling, cover the filling with a layer of dough, separate the pies by trimming, and then carry them into an oven for baking.

Figure 2:
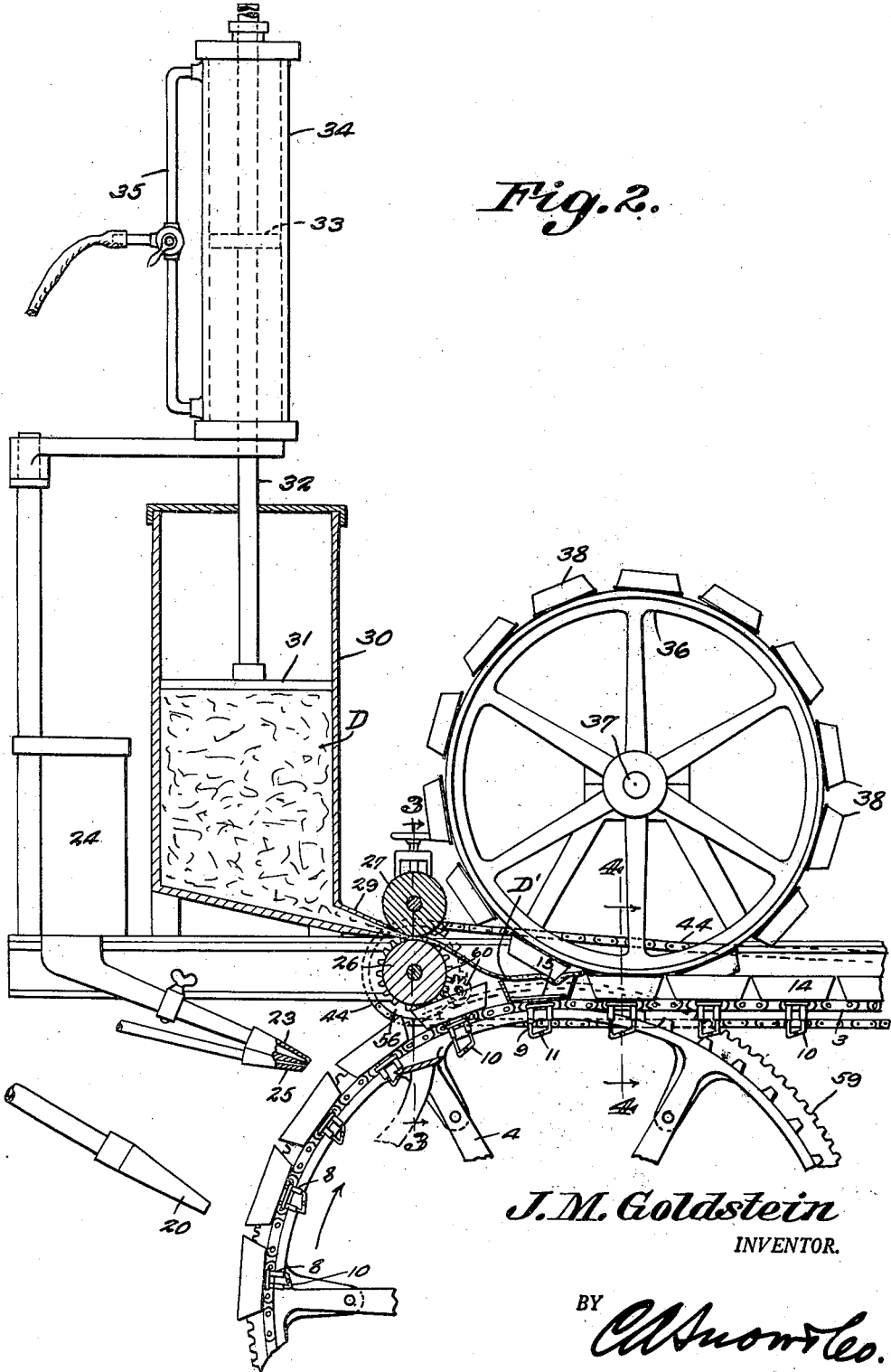
Figure 2 is an enlarged view, partly in section and partly in elevation, of the feed end portion of the machine.
Figure 3:
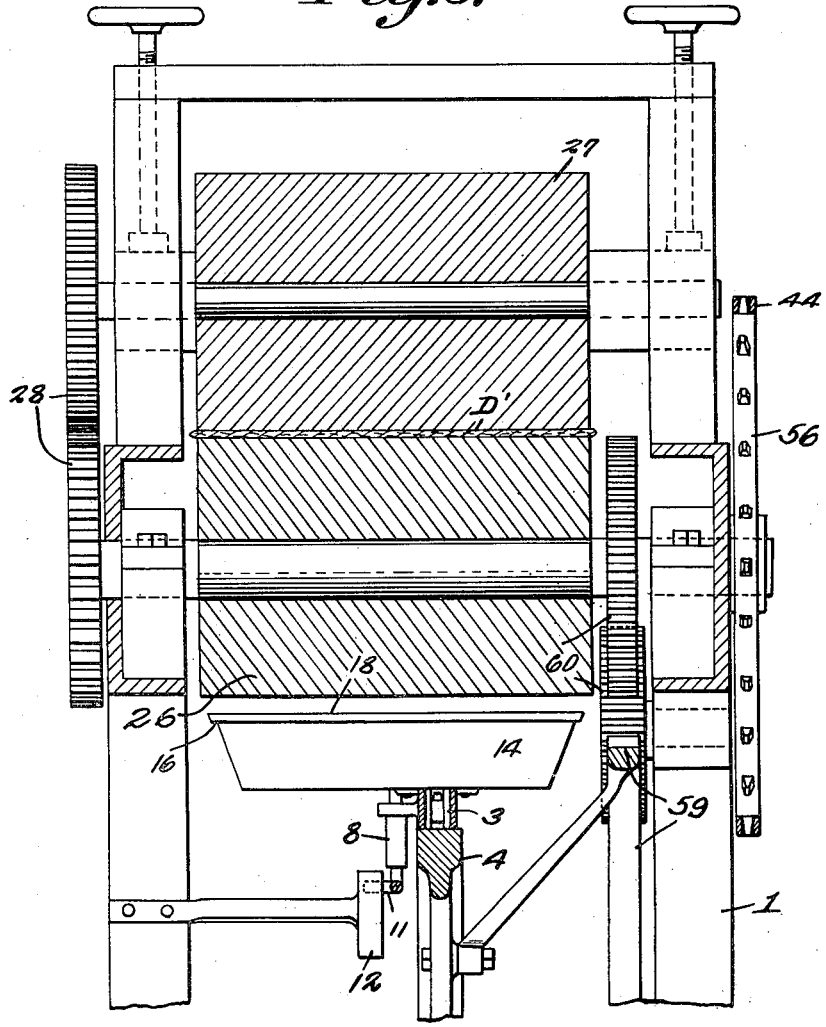
Figure 3 is an enlarged section on line 3—3, Figure 2.

Assuming that the conveyor or chain belt is travelling in the direction indicated by the arrows in Figures 1 and 2, the pans thereon are brought successively into line with a nozzle 20 from which a jet or stream of heated air is constantly discharged onto the pans for the purpose of quickly drying them. Before reaching this station, the pans will have passed through the tank 2 and been subjected to the cleansing action of steam and/or hot water directed thereagainst from nozzles 21 and 22 located within the tank.

After leaving the drying nozzle 20, the pans are brought into position adjacent to the delivery end of greasing nozzle 23 to which grease is fed from a container 24, an air blast nozzle 25 being employed for facilitating the ejection of a mist containing grease against the interiors of the pans as they pass the area into which the nozzle 23 discharges.

After leaving the greasing station, each pan moves past a pair of superposed rollers 26 and 27 operatively connected by gears 28 and adjustable toward or from each other. The space between these rolls is adapted to receive a supply of dough D from a wide-mouth nozzle 29 leading from the bottom of a dough container 30. This container has a plunger 31 carried by the stem 32 of a piston 33 mounted for movement within a cylinder 34, suitable means being provided, as at 35, for directing air or other fluid under pressure against one face of the piston for the purpose of maintaining the dough under desired compression so as to insure the continuous expulsion through nozzle 29 of a sheet of dough the width of which is slightly greater than the overall width of the pans 14. This elongated strip of dough, indicated at D' is deposited on the pans as they move successively into position past the rolls 26 and 27.

A wheel 36 is mounted to rotate freely above the conveyor belt or chain 3, it being supported by shaft 37 and being provided, on its peripheral portion, with regularly spaced dies 38, each of which has its overall dimensions slightly less than the interior dimensions of the pans but being substantially the same shape. The wheel is so located relative to the conveyor belt or chain that, as the pans are advanced in the direction of the arrows by said conveyor belt or chain, said pans will successively engage the dies and cause the wheel to rotate. As the strip of dough indicated at D' is located between the pans and the lower dies, said dies will act to press the dough downwardly into the pans thereunder so that it will fully line the walls and bottom of each pan. It is to be understood, of course, that before the pans reach this position they have been pulled inwardly or downwardly by the cam 12 acting on the lug 11.

After the dough has been spread over the pans and pressed into them, said pans are conveyed beneath a reservoir 39 holding pie filling. This reservoir has an outlet spout 40 extending downwardly therefrom close to the path of the pans and it can contain a rotatable measuring feeder 41 secured to the shaft 42 of a gear 43 driven by a chain 44. The parts are so timed that as the pans with the dough linings are fed under the wide-mouthed outlet spout 40, measured quantities of filling are discharged into the pans. A spreading blade 45 extends across the pans close to the path thereof so that the filling will be smoothed off within the pans as they move toward the delivery end of the machine.

Another dough container 46 is supported above the endless belt or conveyor and has a plunger 47 connected to a piston rod 48 adapted to be actuated by fluid under pressure in the same manner as the rod 42. Thus the dough in the container 46 is kept under constant pressure so as to be fed in a thin sheet through a wide-mounted outlet spout 49 into the space between superposed rolls 50 which can be adjustably mounted relative to each other. These rolls serve to form the dough into a thin continuous sheet as it emerges from the spout 49, and this sheet will move downwardly along a guide board 51 and thence onto the tops of the pans and the fillings therein. From this point the pans, with the covering of dough thereon, move under a roll 52 which serves to press the top layer of dough down onto the upwardly extending flanges 18 on the pans so that the top layer of dough will be joined to the dough lining and will be trimmed off along the edges of the pans. From this trimming roll 52 the pans proceed to the oven 53 through which they travel at such speed as to insure complete baking before they emerge from the oven. As they approach the outlet of the oven, the yokes 9 are brought to position where their lugs 11 can ride on cam 13 and this cam acts to push the yokes outwardly so that the plates 15 are pushed from the pans, thereby freeing the baked pies so that they can gravitate along a guide plate 54 to an endless conveyor 55 leading to suitable packing means. After leaving this delivery station, the pans move downwardly into the tank 2 where they are thoroughly cleaned and thereafter conveyed upwardly to the drying nozzle 20 whereupon the operation already described is repeated.

Figure 9:
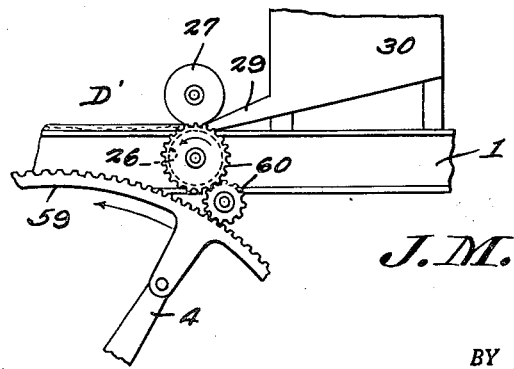
Figure 9 is a view showing, in detail, the means for feeding a strip of dough onto the pans for the purpose of covering the pies.
Figure 4:
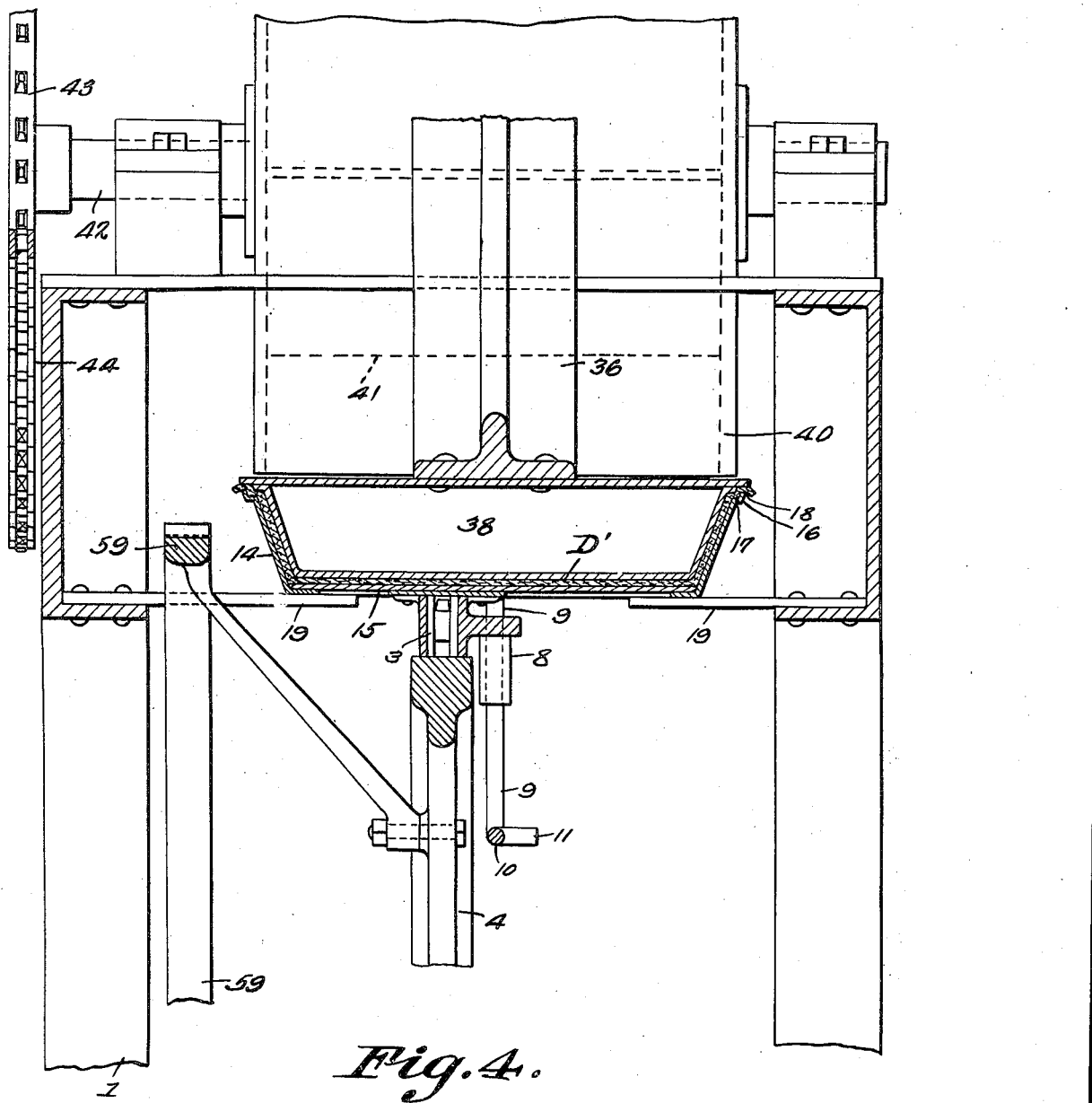
Figure 4 is an enlarged section on line 4—4, Figure 2.

The chain 44 is mounted on a sprocket 56 secured to the shaft of roller 26 and is also mounted on a sprocket 57 secured to the shaft of one of the rolls 50. Motion is transmitted between the shaft 50 and the shaft of roll 52 by chain and sprocket mechanism indicated at 58. Roll 26 is actuated by any suitable mechanism. For example, a large gear 59 rotatable with the sprocket 4 can transmit motion through a chain of gears 60 to said roll 26 as shown, for example, in Figure 9 so that transmission of motion to shaft 42 and rolls 50 and 52 thus is insured. It is to be understood, of course, that one of the shafts 6 can constitute a power shaft for the entire mechanism.

Obviously, with the mechanism properly adjusted and the necessary materials replaced, this machine can operate continuously and will produce pies of any desired shape. As before stated, it is preferred to make them of triangular or segmental contours thereby to simulate the ordinary slice of pie. Each pie can be handled without danger of dripping during the handling operation and it has been found in practice that a pie thus shaped can be produced as an immediate appeal to the consumer.

It is to be understood, of course, that all parts of the machine need not be made automatic. In Figure 10, a somewhat modified structure has been shown wherein the pan conveyor or carrier is in the form of a belt 61 having shallow recesses 62 (see Figure 11) in which the pans 63 are located. These pans, which can be lined with removable foil 64, are brought successively after the filling and trimming operation to a table 65 where they can be removed from or left in the pans and thereafter subjected to the action of a sweep 66 which can be operated as desired to push a number of the formed pies transversely of the table and into an oven 67 from which they can subsequently be removed after the baking process has been concluded. In this modified structure the trimming roll has been indicated at 68 and the cooperating rolls for feeding a strip of dough onto the pans have been indicated at 69. The strip of covering material in the form of rolled dough, has been indicated throughout the drawings at C.

In any or all of the machines the pies can be baked in pans of aluminum foil or the like which will be sold with the pies and can be discarded by the purchaser.

Furthermore, it has been found that by utilizing infra-red lamps the baking process can be expedited and made more thorough than ordinarily.

By employing pans of metal foil the pies can be thoroughly baked therein and they will not impart an objectionable flavor to the pies nor retard the baking operation. As the pans are of foil they are inexpensive and can be discarded after once being used.

What is claimed is:

1. In a conveyor construction for a pie making machine an endless, sprocket driven conveyor chain; bottomless pans fixedly mounted thereupon; pairs of guides secured to the sides of links of said chain; a yoke slidably mounted in each pair of guides; a flat plate comprising a bottom for each pan secured to each yoke; and fixed cams disposed adjacent said conveyor chain, and respectively engaging the yokes for slidably shifting said yokes within their guides for raising and lowering of the pan bottoms relative to the pans.

2. In a conveyor construction for a pie making machine an endless sprocket driven conveyor chain; a pan member secured to each link of the chain, said pan member being shaped to define the side wall only of a pie tin; a pair of guides secured to and extending laterally from each link; a U-shaped yoke slidably mounted in each pair of guides, each yoke having an inclined base; a flat plate fixedly secured to each yoke and defining the bottom of said pie tin; and fixed cams mounted adjacent said conveyor chain and respectively engageable with the inclined base of each yoke for, in succession, lowering and elevating each plate relative to its associated pan.

JACOB M. GOLDSTEIN.

REFERENCES CITED

The following references are of record in the file of this patent:

UNITED STATES PATENTS

| Number | Name | Date |
| --- | --- | --- |
| 748,392 | Manning | Dec. 29, 1903 |
| 794,130 | Sons | July 4, 1905 |
| 1,285,086 | Falkinburg | Nov. 19, 1918 |
| 1,526,397 | Thornton | Feb. 17, 1925 |
| 1,595,427 | Smith | Aug. 10, 1926 |
| 1,653,402 | Kazer | Dec. 20, 1927 |
| 1,707,816 | Sachs | Apr. 2, 1929 |
| 1,716,556 | Kones | June 11, 1929 |
| 1,774,671 | Ronzoni et al. | Sept. 2, 1930 |
| 1,839,731 | Baum | Jan. 5, 1932 |
| 2,158,910 | Pellar | May 16, 1939 |

FOREIGN PATENTS

| Number | Country | Date |
| --- | --- | --- |
| 734,701 | France | Aug. 8, 1932 |